(12) United States Patent
Xiong

(10) Patent No.: US 12,380,660 B2
(45) Date of Patent: Aug. 5, 2025

(54) METHOD AND DEVICE FOR DIRECT PASSTHROUGH IN VIDEO SEE-THROUGH (VST) AUGMENTED REALITY (AR)

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 18/296,095

(22) Filed: Apr. 5, 2023

(65) Prior Publication Data

US 2024/0062483 A1     Feb. 22, 2024

Related U.S. Application Data

(60) Provisional application No. 63/400,010, filed on Aug. 22, 2022.

(51) Int. Cl.
*G06T 19/00*     (2011.01)
*G06V 10/74*     (2022.01)
(Continued)

(52) U.S. Cl.
CPC .......... *G06T 19/006* (2013.01); *G06V 10/761* (2022.01); *H04N 13/117* (2018.05); *H04N 13/383* (2018.05)

(58) Field of Classification Search
CPC .. G06T 19/006; H04N 13/383; H04N 13/117; G06V 10/761
See application file for complete search history.

(56) References Cited

U.S. PATENT DOCUMENTS 10,616,568 B1 *   4/2020   Lin ..................... H04N 13/383
11,263,794 B2   3/2022   Huang et al.
(Continued)

FOREIGN PATENT DOCUMENTS

| CN | 109002164 A | 12/2018 |
|---|---|---|
| CN | 113376833 A | 9/2021 |
| KR | 10-1818839 B1 | 1/2018 |

OTHER PUBLICATIONS

Ballestin, Giorgio, "A Registration Framework for the Comparison of Video and Optical See-Through Devices in Interactive Augmented Reality," IEEE Access, Apr. 2021, vol. 9, pp. 64828-64843 (Year: 2021).*

(Continued)

*Primary Examiner* — Terrell M Robinson

(57) ABSTRACT

A method includes receiving first and second images from first and second see-through cameras with first and second camera viewpoints. The method also includes generating a first virtual image corresponding to a first virtual viewpoint by applying a first mapping to the first image. The first mapping is based on relative positions of the first camera viewpoint and the first virtual viewpoint corresponding to a first eye of a user. The method further includes generating a second virtual image corresponding to a second virtual viewpoint by applying a second mapping to the second image. The second mapping is based on relative positions of the second camera viewpoint and the second virtual viewpoint corresponding to a second eye of the user. In addition, the method includes presenting the first and second virtual images to the first and second virtual viewpoints on at least one display panel of an augmented reality device.

20 Claims, 11 Drawing Sheets

(51) Int. Cl.
*H04N 13/117* (2018.01)
*H04N 13/383* (2018.01)

(56) References Cited

U.S. PATENT DOCUMENTS

| | | | |
|---|---|---|---|
| 11,314,088 | B2 | 4/2022 | Yun et al. |
| 2010/0045783 | A1 | 2/2010 | State et al. |
| 2013/0176405 | A1 | 7/2013 | Jeong et al. |
| 2016/0337630 | A1* | 11/2016 | Raghoebardajal .... A63F 13/212 |
| 2019/0206119 | A1 | 7/2019 | Nam et al. |
| 2019/0244005 | A1* | 8/2019 | Suzuki ................. G06V 40/193 |
| 2019/0325658 | A1 | 10/2019 | Park et al. |
| 2019/0354259 | A1 | 11/2019 | Park |
| 2020/0004018 | A1 | 1/2020 | Lee et al. |
| 2020/0326774 | A1* | 10/2020 | Hong ....................... G06T 11/60 |
| 2022/0060680 | A1 | 2/2022 | Kawamae et al. |
| 2022/0070427 | A1 | 3/2022 | Ha et al. |
| 2022/0150386 | A1 | 5/2022 | da Costa Marques Arrabel et al. |
| 2022/0239888 | A1 | 7/2022 | Yamaguchi et al. |
| 2022/0329775 | A1* | 10/2022 | Lakshman ............ H04N 13/383 |
| 2022/0334636 | A1* | 10/2022 | Miettinen ............... G06F 3/013 |
| 2022/0414823 | A1* | 12/2022 | Chapiro .................... G06T 3/18 |

OTHER PUBLICATIONS

International Search Report and Written Opinion of the International Searching Authority dated Oct. 6, 2023 in connection with International Patent Application No. PCT/KR2023/009166, 8 pages.
Cutolo et al., "[Poster] Hybrid Video/Optical See-Through HMD," IEEE International Symposium on Mixed and Augmented Reality Proceedings, Oct. 2017, 6 pages.

* cited by examiner

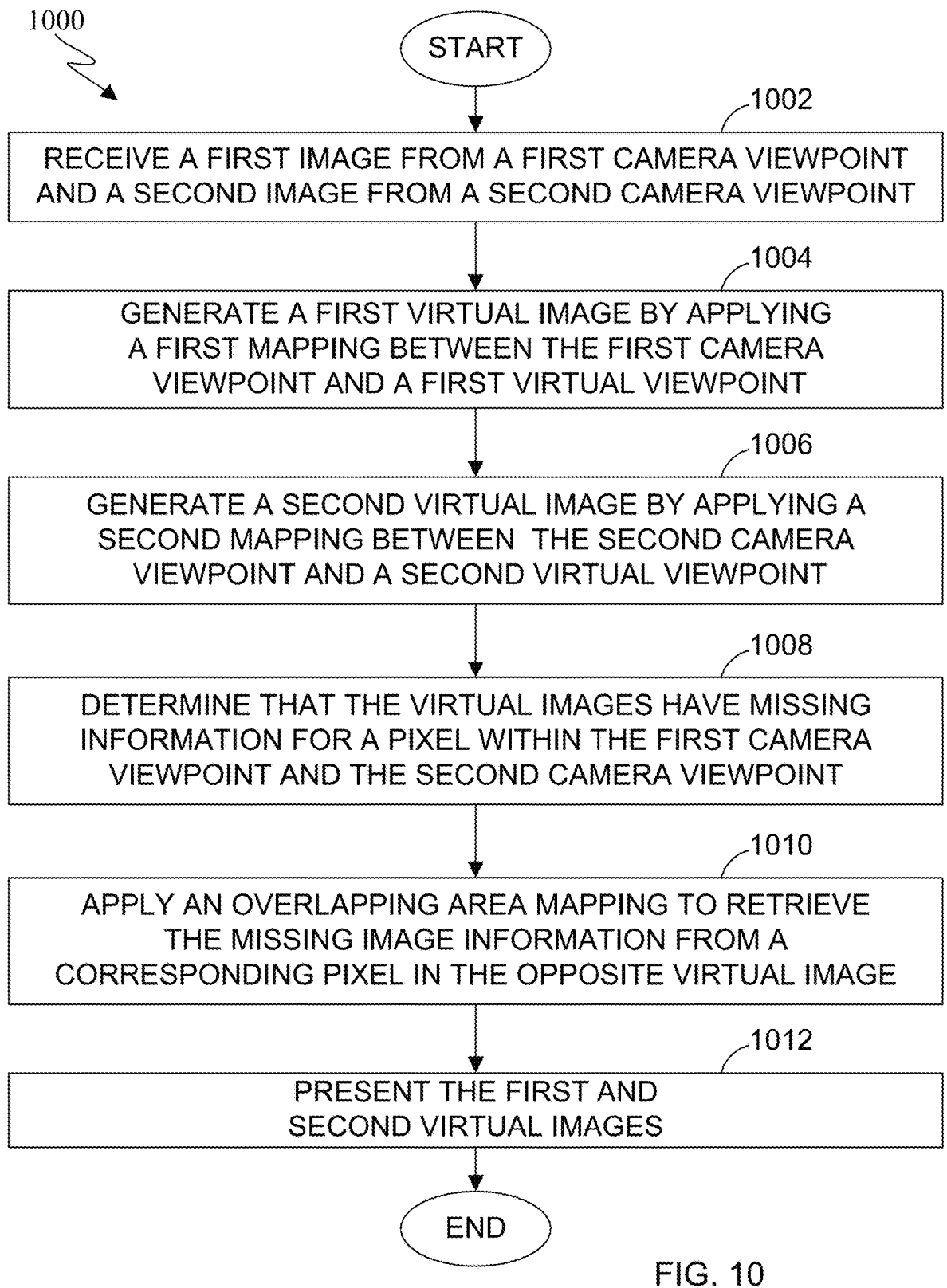

METHOD AND DEVICE FOR DIRECT PASSTHROUGH IN VIDEO SEE-THROUGH (VST) AUGMENTED REALITY (AR)

CROSS-REFERENCE TO RELATED APPLICATION AND PRIORITY CLAIM

This application claims priority under 35 U.S.C. § 119(e) to U.S. Provisional Patent Application No. 63/400,010 filed on Aug. 22, 2022, which is hereby incorporated by reference in its entirety.

TECHNICAL FIELD

This disclosure relates generally to augmented reality (AR) systems and processes. More specifically, this disclosure relates to a method and device for direct passthrough in video see-through (VST) AR.

BACKGROUND

Augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

SUMMARY

This disclosure provides a method and device for direct passthrough in video see-through (VST) augmented reality (AR).

In a first embodiment, a method includes obtaining a first image from a first see-through camera with a first camera viewpoint and a second image from a second see-through camera with a second camera viewpoint. The method also includes generating a first virtual image corresponding to a first virtual viewpoint by applying a first mapping to the first image, where the first mapping is based on relative positions of the first camera viewpoint and the first virtual viewpoint corresponding to a first eye of a user. The method further includes generating a second virtual image corresponding to a second virtual viewpoint by applying a second mapping to the second image, where the second mapping is based on relative positions of the second camera viewpoint and the second virtual viewpoint corresponding to a second eye of the user. In addition, the method includes presenting the first virtual image to the first virtual viewpoint and the second virtual image to the second virtual viewpoint on at least one display panel of an AR device.

In a second embodiment, a VST AR device includes at least one display panel, a first see-through camera, a second see-through camera, and at least one processing device. The at least one processing device is configured to obtain a first image from the first see-through camera with a first camera viewpoint and a second image from the second see-through camera with a second camera viewpoint. The at least one processing device is also configured to apply a first mapping to the first image in order to generate a first virtual image corresponding to a first virtual viewpoint, where the first mapping is based on relative positions of the first camera viewpoint and the first virtual viewpoint corresponding to a first eye of a user. The at least one processing device is further configured to apply a second mapping to the second image in order to generate a second virtual image corresponding to a second virtual viewpoint, where the second mapping is based on relative positions of the second camera viewpoint and the second virtual viewpoint corresponding to a second eye of the user. In addition, the at least one processing device is configured to initiate presentation of the first virtual image to the first virtual viewpoint and the second virtual image to the second virtual viewpoint on the at least one display panel.

In a third embodiment, a non-transitory machine readable medium contains instructions that when executed cause at least one processor to obtain a first image from a first see-through camera with a first camera viewpoint and a second image from a second see-through camera with a second camera viewpoint. The non-transitory machine readable medium also contains instructions that when executed cause the at least one processor to apply a first mapping to the first image in order to generate a first virtual image corresponding to a first virtual viewpoint, where the first mapping is based on relative positions of the first camera viewpoint and the first virtual viewpoint corresponding to a first eye of a user. The non-transitory machine readable medium further contains instructions that when executed cause the at least one processor to apply a second mapping to the second image in order to generate a second virtual image corresponding to a second virtual viewpoint, where the second mapping is based on relative positions of the second camera viewpoint and the second virtual viewpoint corresponding to a second eye of the user. In addition, the non-transitory machine readable medium contains instructions that when executed cause the at least one processor to initiate presentation of the first virtual image to the first virtual viewpoint and the second virtual image to the second virtual viewpoint on at least one display panel of an AR device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a HMD, electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an example method for direct passthrough in VST AR in accordance with this disclosure.

DETAILED DESCRIPTION

FIGS. 1 through 10, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

In various implementations, see-through cameras are typically high-resolution cameras (such as 2K or 4K cameras or higher). In order to provide quality user experiences with AR headsets, the latency of video frame transformations may need to be as low as possible in order to reduce or prevent users from noticing delays when moving their heads. However, existing techniques generally cannot process high-resolution images from see-through cameras to generate virtual view frames with adequately low latencies.

Unlike optical see-through AR in which a user can see a surrounding scene directly, video see-through AR recreates the surrounding scene using see-through cameras installed on an AR headset. Because the positions of the see-through cameras are different from the positions of the user's eyes, virtual images at the viewpoints of the user's eyes are generated from the image frames captured at the viewpoints of the see-through cameras. In this manner, the user's eyes can see the outside scene through the cameras as if the see-through cameras were installed at the viewpoints of eyes. This disclosure provides a solution for low-latency transformation of high-resolution images from see-through cameras to virtual cameras, which can be referred to as direct passthrough video frame transformation. The direct passthrough video frame transformation provides for a more accurate visualization of a surrounding scene, which enhances the user experiences, particularly when interacting with objects in the surrounding scene.

Figure 1:
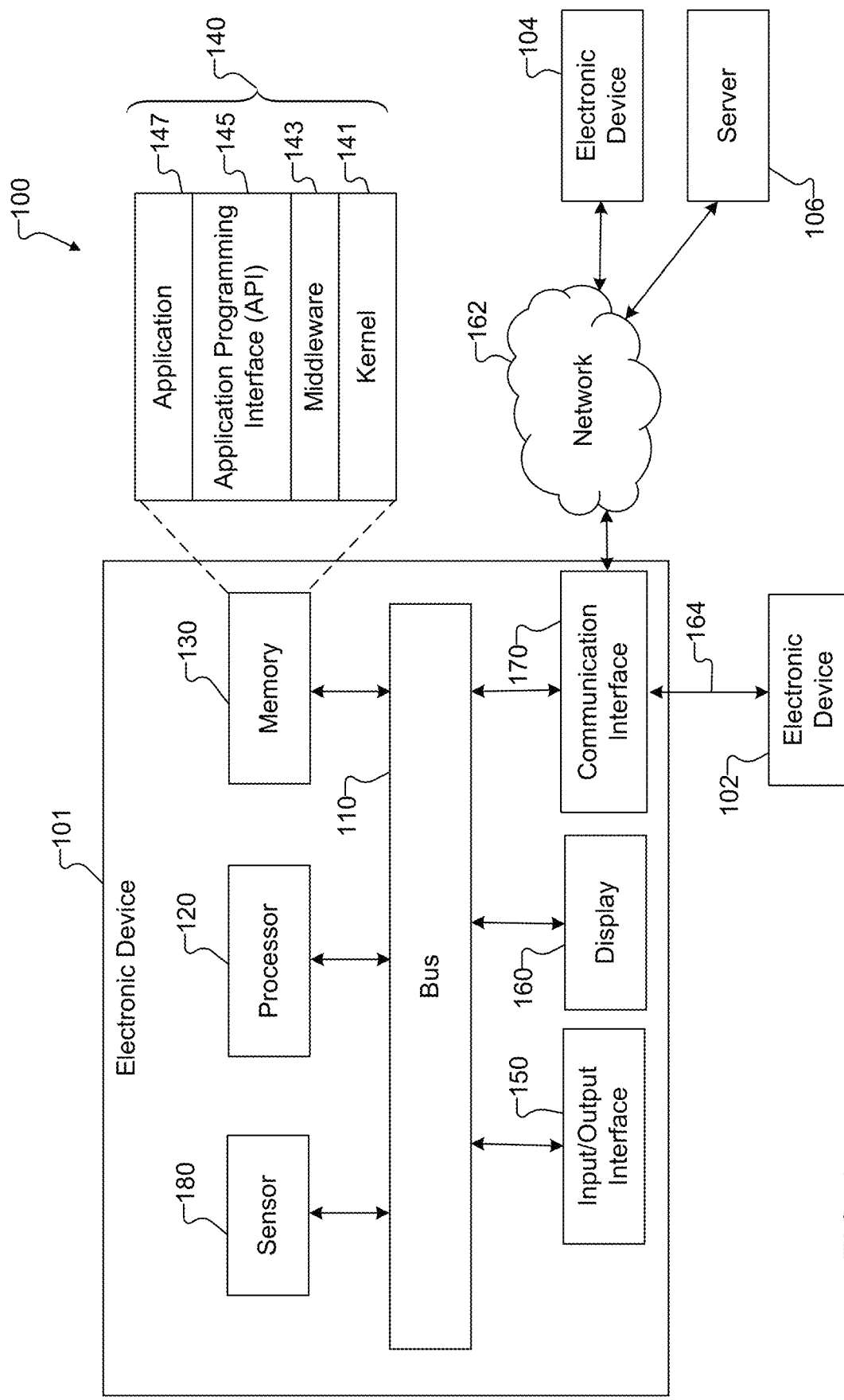
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may obtain and process input images to perform direct passthrough to support at least one VST AR application as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input images to perform direct passthrough to support at least one VST AR application. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may obtain and process input images to perform direct passthrough to support at least one VST AR application as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
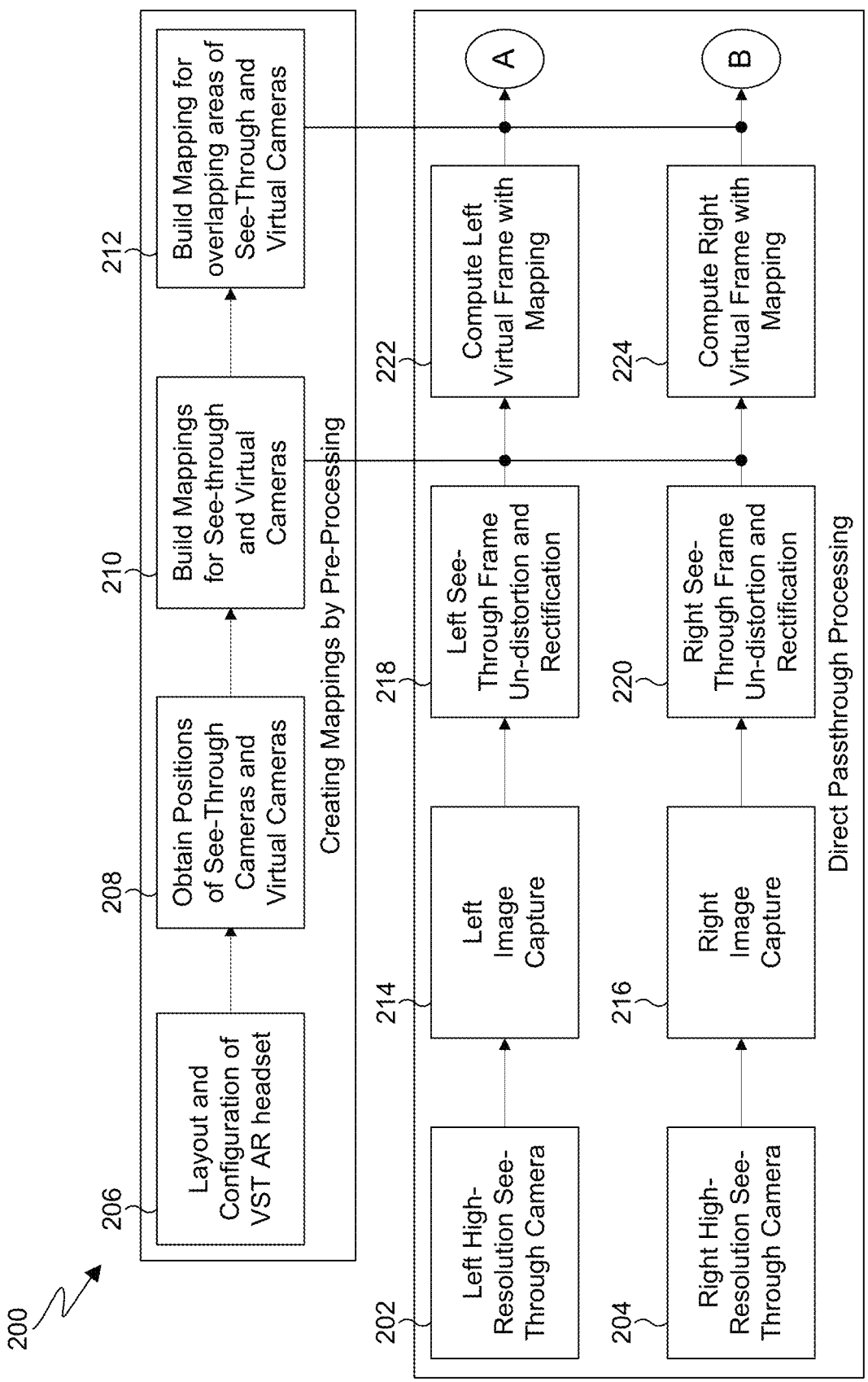
FIGS. 2A and 2B illustrate an example process for direct passthrough transformation in video see-through (VST) augmented reality (AR) in accordance with this disclosure.
Figure 2B:
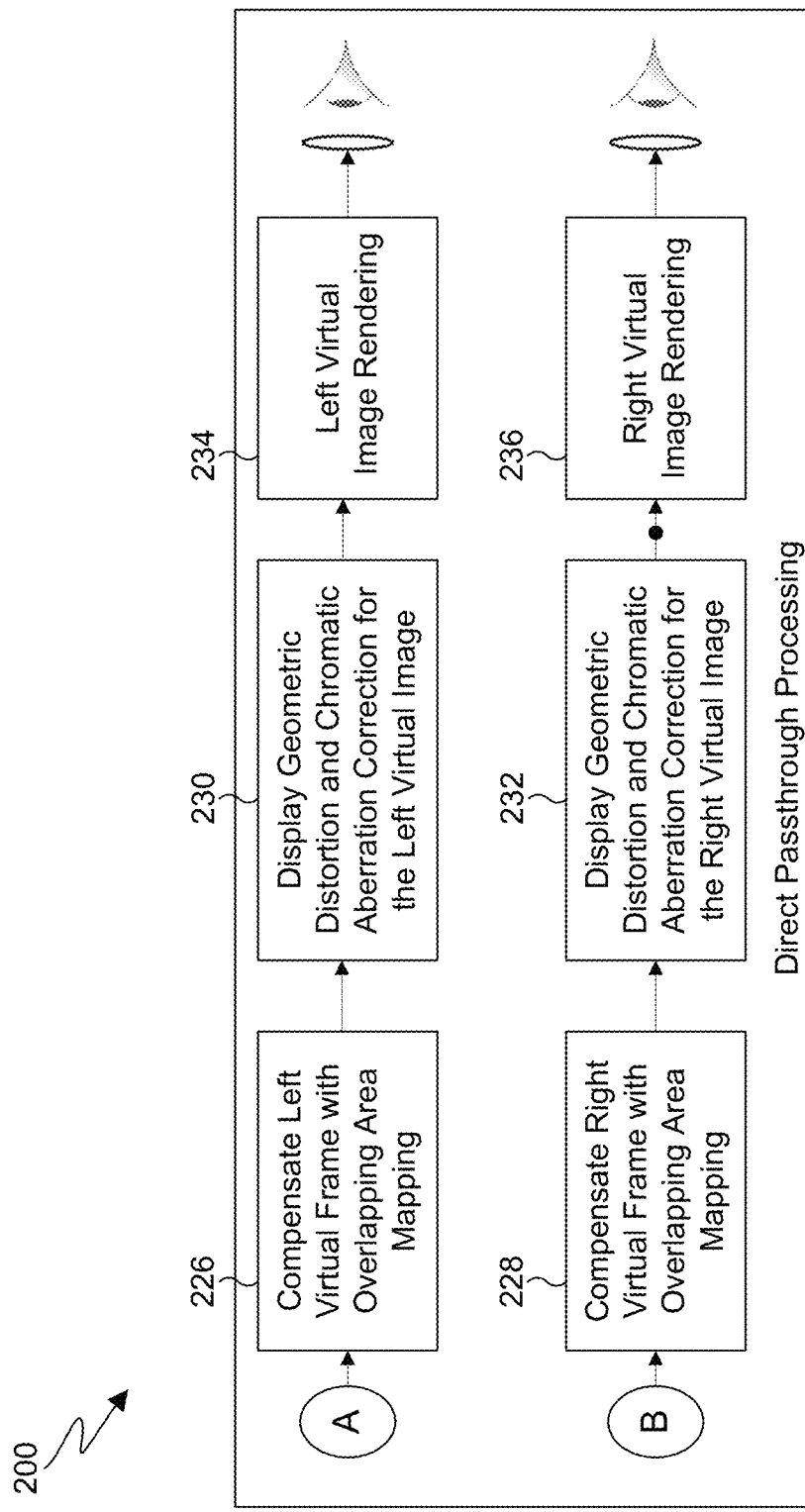

FIGS. 2A and 2B illustrate an example process 200 for direct passthrough transformation in VST AR in accordance with this disclosure. For ease of explanation, the process 200 of FIGS. 2A and 2B is described as being performed using the electronic device 101 of FIG. 1. However, the process 200 may be used with any other suitable device(s) and in any other suitable system(s).

As shown in FIG. 2A, the electronic device 101 includes first and second high-resolution see-through cameras 202 and 204. For example, the electronic device 101 may include one or more sensors 180 that implement the high-resolution see-through cameras 202 and 204. In some embodiments, the first and second high-resolution see-through cameras 202 and 204 can be arranged as left and right high-resolution see-through cameras. The see-through cameras 202 and 204 can capture images having any suitable resolution and dimensions depending on the capabilities of the see-through cameras 202 and 204. The images can also include image data in any suitable format. In some embodiments, for instance, the images includes RGB image data, which typically includes image data in three color channels (namely red, green, and blue color channels). However, the images may include image data having any other suitable form or arrangement.

A layout of the see-through cameras 202 and 204 can be fixed on the electronic device 101 and therefore have a specified layout and configuration 206. For example, the position and orientation of the see-through cameras 202 and 204 can be fixed in relation to a specific component of the electronic device 101 or a specified location of the electronic device 101. In some embodiments, the spacing for the see-through cameras 202 and 204 can be based on an average human interpupillary distance (IPD) or a distance between a left eye and a right eye of a user. In other embodiments, the spacing can be customized, such as based on the specific interpupillary distance of a given user.

The electronic device 101 can perform an obtain camera positions operation 208 in order to obtain the positions of the see-through cameras 202 and 204. The obtain camera positions operation 208 can also obtain positions of virtual cameras. For example, the electronic device 101 may detect the positions of a user's eyes in order to determine the positions of the virtual cameras. The electronic device 101 can also perform a build camera mappings operation 210 to determine a relationship between the first and second see-through cameras 202 and 204 and the first and second virtual cameras. For instance, first and second mappings can be generated based on the parameters and configuration of the first and second see-through cameras 202 and 204 and the first and second virtual cameras. As particular examples, the first mapping can be generated for determining a geometry between the first high-resolution see-through camera 202 and the first virtual camera, and the second mapping can be generated for determining a geometry between the second high-resolution see-through 204 and the second virtual camera.

Due to the separation between the first and second see-through cameras 202 and 204, the see-through cameras 202 and 204 can capture a scene from different perspectives, which allows each of first and second images to capture details that may be obstructed by the other image. For example, the second high-resolution see-through camera 204 may capture features that are obstructed by an object from the perspective of the first see-through camera 202, and the first see-through camera 202 may capture features that are obstructed by the same object from the perspective of the second see-through camera 204. The electronic device 101 can perform a build overlapping area mapping operation 212 to identify overlapping areas of images captured from the first and second see-through cameras 202 and 204 and presentations of the first and second virtual cameras.

The see-through cameras 202 and 204 can respectively be used to perform first and second image capture operations 214 and 216 in order to generate first and second images. In some embodiments, the first and second images can be left and right image captures from left and right high-resolution see-through cameras. The electronic device 101 can also perform un-distortion and rectification operations 218 and 220 using the first and second images from the image capture operations 214 and 216. For example, an image may be distorted due to the physical or operational characteristics of the imaging sensor 180 that captured the image, and each un-distortion and rectification operation 218 and 220 can operate to warp or otherwise reduce or remove these distortions from the image. In some embodiments, the un-distortion and rectification operations 218 and 220 may have access to a distortion model and imaging sensor calibration parameters and may use this information to perform the image un-distortion. The distortion model represents a model of how an imaging sensor 180 is known to distort images, which (in some cases) may be generated during calibration of the imaging sensor 180. For instance, the imaging sensor 180 may capture images of known objects or scenes so that differences between captured and expected images may be identified and used to produce a model of how the imaging sensor 180 distorts the known objects or scenes. The imaging sensor calibration parameters represent specific parameters of the design or operation of the imaging sensor 180, such as the imaging sensor's focal length. The un-distortion and rectification operations 218 and 220 can also rectify or align the captured images. The image un-distortion and rectification operations 218 and 220 can use any suitable techniques to un-distort and rectify images. For instance, the image un-distortion and rectification operations 218 and 220 may use the intrinsic and extrinsic parameters of the see-through cameras 202 and 204 to un-distort and rectify the images.

First and second virtual frame generation operations 222 and 224 are performed by the electronic device 101 in order to respectively generate first and second virtual frames. For example, the first and second virtual frames can be determined by respectively applying the first and second mappings (as generated by the build camera mappings operation 210) to the first and second images (as generated by the first and second image capture operations 214 and 216). The first mapping can be used with the first image to generate the first virtual image, and the second mapping can be used with the second image to generate the second virtual image. The electronic device 101 can also respectively perform first and second overlapping areas compensation operations 226 and 228 on the first and second virtual images from the first and second virtual frame generation operations 222 and 224 using the overlapping area mapping from the build overlapping area mapping operation 212. For instance, the overlapping area mappings can be used to compensate for artifacts or holes created in viewpoint matching during the generation of the virtual images.

First and second geometric distortion calibration and chromatic aberration correction operations 230 and 232 can be performed to identify and compensate for lens distortions or other distortions of a VST AR headset. For example, the correction operations 230 and 232 can be used to identify any geometric distortions in a warped image and to remap a source image to an un-warped image as if it was taken with a perspective lens. The correction operations 230 and 232 can also calibrate an image based on known different indices of refraction across a lens, which can increase false colors in an image as the distance from a center of the image increases. In some cases, chromatic aberrations can be corrected according to lens data and focal length information using the configuration of the VST AR headset, where the electronic device 101 uses the information from the correction operations 230 and 232 to correct the first and second video frames based on characteristics of one or more display panels.

First and second display rendering operations 234 and 236 can render first and second final video frames for display on the one or more display panels. For the rendering operations 234 and 236, the electronic device 101 can display a first virtual image and a second virtual image. Depending on the implementation, the first and second display rendering operations 234 and 236 can be pre-rendered or can be dynamically rendered. Note that the display panel(s) used here may represent two separate display panels (such as left and right display panels separately viewable by the eyes 244 of the user) or a single display panel (such as one where left and right portions of the display panel are separately viewable by the eyes 244 of the user).

It should be noted that the functions shown in or described with respect to FIGS. 2A and 2B can be implemented in an electronic device 101, 102, 104, server 106, or other device(s) in any suitable manner. For example, in some embodiments, at least some of the functions shown in or described with respect to FIGS. 2A and 2B can be implemented or supported using one or more software applications or other software instructions that are executed by the processor 120 of the electronic device 101, 102, 104, server 106, or other device(s). In other embodiments, at least some of the functions shown in or described with respect to FIGS. 2A and 2B can be implemented or supported using dedicated hardware components. In general, the functions shown in or described with respect to FIGS. 2A and 2B can be performed using any suitable hardware or any suitable combination of hardware and software/firmware instructions.

Although FIGS. 2A and 2B illustrate one example of process 200 for video transformation for video see-through AR, various changes may be made to FIGS. 2A and 2B. For example, while shown as a series of operations, various operations in FIGS. 2A and 2B may overlap, occur in parallel, occur in a different order, or occur any number of times. Also, various components and functions in FIGS. 2A and 2B may be combined, further subdivided, replicated, or rearranged according to particular needs. Further, one or more additional components and functions may be included if needed or desired. In addition, while FIG. 2 illustrates various pairs of operations occurring in parallel (such as the operations 214-216, operations 218-220, operations 222-224, operations 226-228, operations 230-232, or operations 234-236), other embodiments may perform a common operation sequentially multiple times in order to achieve the same or similar results.

Figure 3:
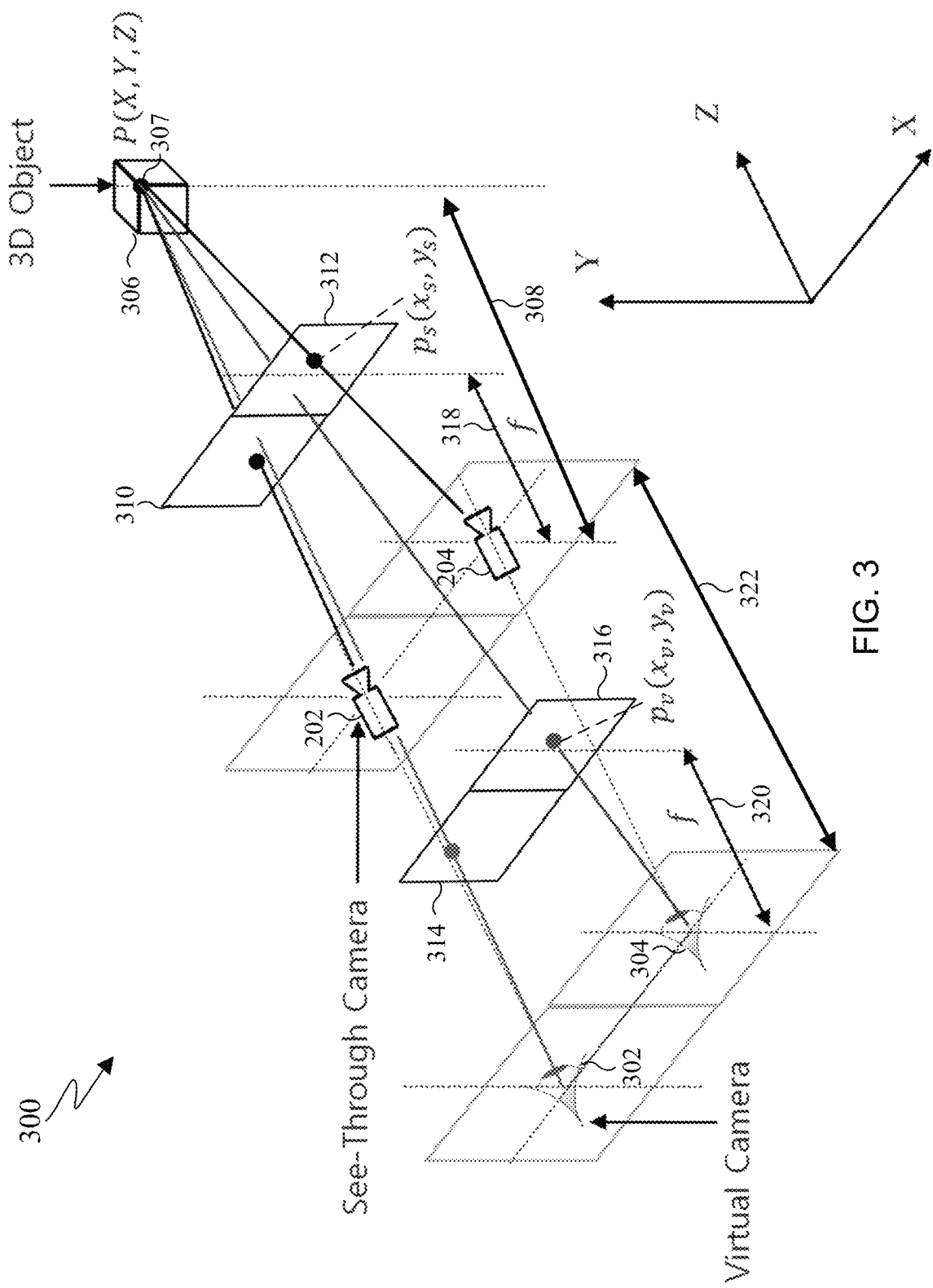
FIG. 3 illustrates an example arrangement between first and second see-through cameras and first and second virtual cameras in accordance with this disclosure.

FIG. 3 illustrates an example arrangement 300 between first and second see-through cameras 202 and 204 and first and second virtual cameras 302 and 304 in accordance with this disclosure. The arrangement 300 here represents an example of positions of the first and second see-through cameras 202 and 204 and the first and second virtual cameras described above with respect to FIGS. 2A and 2B. In some cases, the arrangement 300 here may be defined using the layout and configuration 206.

As shown in FIG. 3, the arrangement 300 represents a geometry for a direct passthrough transformation from the first and second see-through cameras 202 and 204 to virtual cameras 302 and 304 associated with a user's eyes. The arrangement 300 here shows the relationships among a 3D scene, see-through camera imaging, and virtual camera imaging. The arrangement 300 also includes a representative 3D object 306 in a scene at a depth d 308. The 3D object 306 here is used for explaining positioning of a point P(X, Y, Z) 307 on the object 306 to each of first and second see-through frames 310 and 312 and first and second virtual frames 314 and 316. The first and second see-through cameras 202 and 204 have a focal length f 318. The first see-through camera 202 generates the first see-through frame 310 (such as a left see-through frame), and the second see-through camera 204 generates the second see-through frame 312 (such as a right see-through frame).

The first and second virtual cameras 302 and 304 can correspond to the viewpoints of the user's eyes. The first virtual camera 302 can be located at the viewpoint of a first eye (such as the user's left eye), and the second virtual camera 304 can be located at the viewpoint of a second eye (such as the user's right eye). Eye relief can be represented by f, which is also a focal length 320 of the first and second virtual cameras 302 and 304. The first virtual camera 302 is associated with the first virtual frame 314 (such as a left virtual image), and the right virtual camera 304 is associated with the second virtual frame 316 (such as a right virtual image).

In this configuration, the first see-through camera 202 is aligned with the first virtual camera 302, and the second see-through camera 204 is aligned with the second virtual camera 304. The distance 322 between the first and second see-through cameras 202 and 204 and the first and second virtual camera 302 and 304 is dr. The depth 308 of the 3D object related to the first and second see-through cameras 202 and 204 is d. Assuming the first see-through camera 202 and the first virtual camera 302 can capture the same pixel in a 3D scene, the first see-through camera 202 can generate imaging of the pixel in the first see-through frame 310, and the first virtual camera 302 can generate imaging of the same pixel in the first virtual frame 314. The same can be true for the second see-through camera 204 and the second virtual camera 304. A mapping between the see-through camera imaging and the virtual camera imaging can be used for the direct passthrough transformation in the first and second virtual frame generation operations 222 and 224.

Although FIG. 3 illustrates one example of an arrangement 300 between first and second see-through cameras 202 and 204 and first and second virtual cameras 302 and 304, various changes may be made to FIG. 3. For example, the spacings of various components in the arrangement 300 can vary as needed or desired. Also, the arrangement 300 may be used in any other suitable video transformation process and is not limited to the specific processes described above.

Figure 4B:
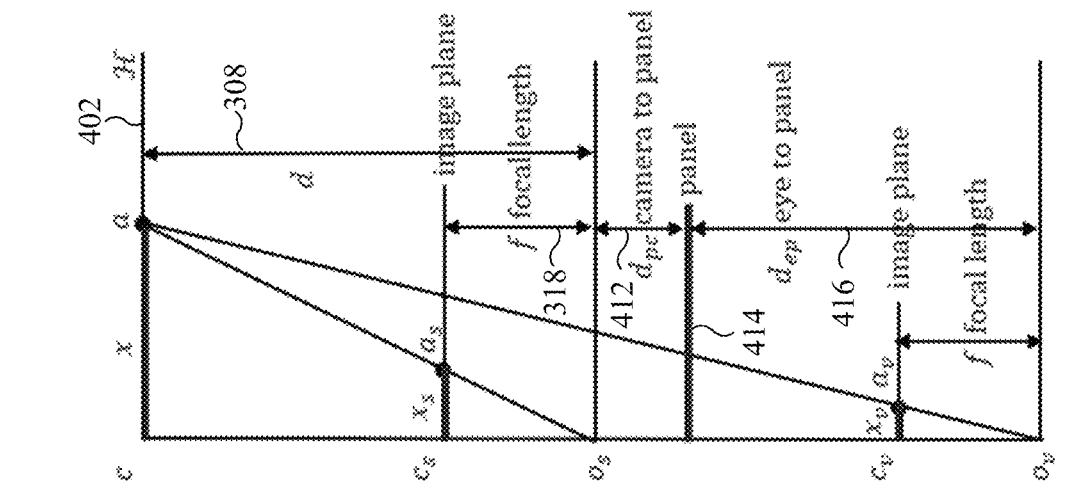
FIGS. 4A and 4B illustrate example geometries of direct passthrough with constant depth in VST AR in accordance with this disclosure.
Figure 4A:
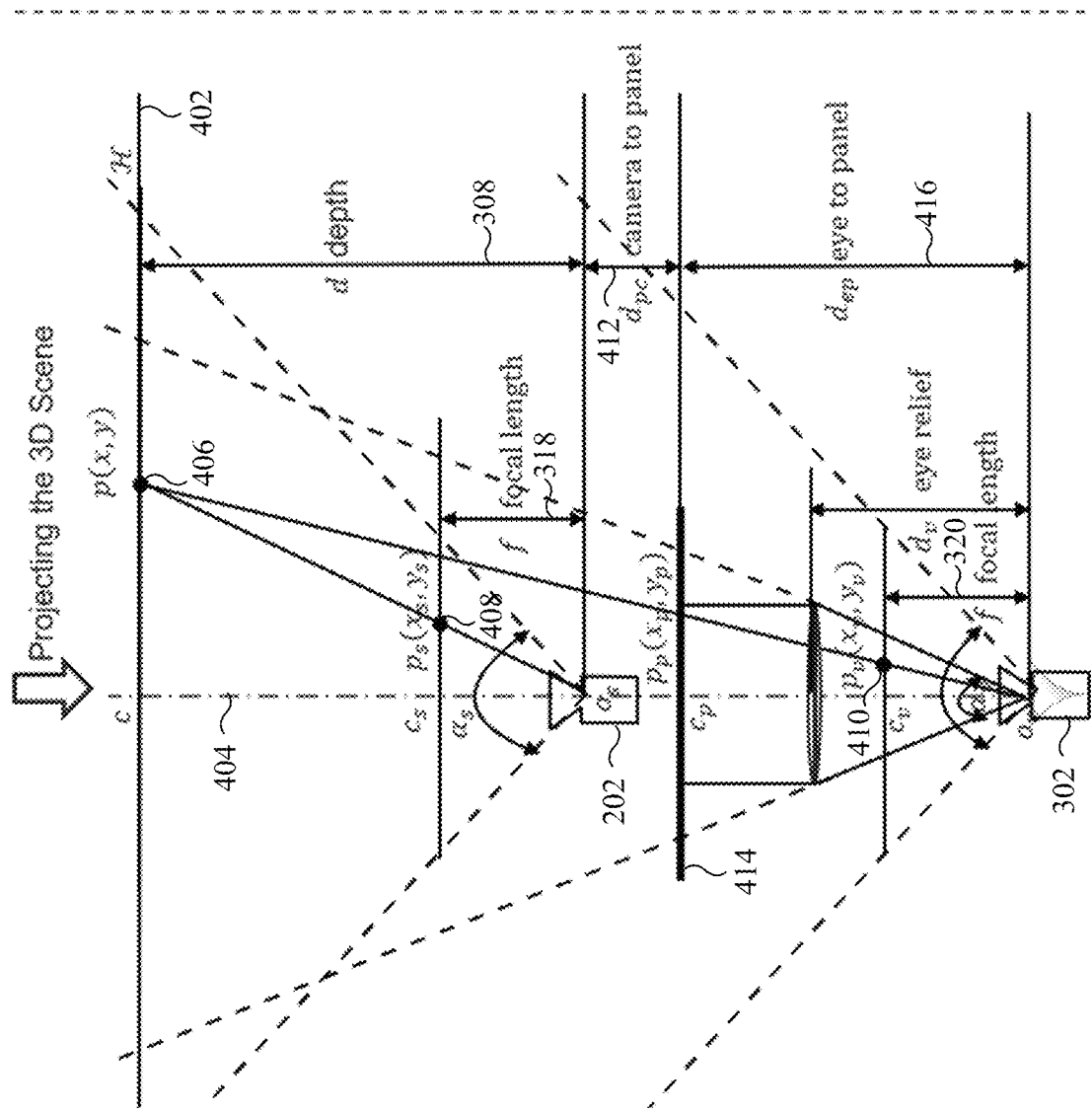

FIGS. 4A and 4B illustrate example geometries 400 and 401 of direct passthrough with constant depth in VST AR in accordance with this disclosure. In particular, FIG. 4A illustrates an example camera geometry 400, and FIG. 4B illustrates an example imaging geometry 401. The camera geometry 400 and the imaging geometry 401 here may represent examples of information from the obtain camera positions operation 208 used by the build camera mappings operation 210 shown in FIG. 2A.

As shown in FIGS. 4A and 4B, the example geometries 400 and 401 show relationships among a constant depth scene, see-through camera imaging, and virtual camera imaging. A 3D scene can be projected to a plane $\mathcal{H}$ 402, which is located at the depth d 308 from the first see-through camera 202 and is perpendicular to a principal optical axis 404 of the first see-through camera 202. Since the 3D scene is projected to a plane 402 with a constant depth 308 to the first see-through camera 202, the projected scene is a constant scene. The 3D point P(X, Y, Z) 307 projects to the plane $\mathcal{H}$ 402 as a pixel p(x,y) 406. Both the first see-through camera 202 and the first virtual camera 302 can see the same pixel p(x,y) 406. The pixel p(x,y) 406 can be projected to the first see-through camera 202 as a pixel $p_s(x_s,y_s)$ 408 and to the first virtual camera 302 as a pixel $p_v(x_v,y_v)$ 410. A relationship between the pixel $p_s(x_s,y_s)$ 408 and the pixel $p_v(x_v,y_v)$ 410 can be generated with their relationships to the pixel p(x,y) 406.

In some embodiments, the x-axis relationship between the pixel $p_s(x_s,y_s)$ 408 ($\Delta o_s c_s a_s$) and the pixel p(x,y) 406 ($\Delta o_s ca$) can be defined as follows.

$$\frac{x}{x_s} = \frac{d}{f_s} \tag{1}$$

Here, x represents a distance along the x-axis of the pixel p(x,y) 406 from the principal axis 404, $x_s$ represents a distance along the x-axis of the pixel $p_s(x_s,y_s)$ 408 from the principal axis 404, d 308 represents a distance of the pixel p(x,y) 406 from the first see-through camera 202, and $f_s$ 318 represents a distance of the pixel $p_s(x_s,y_s)$ 408 from the first see-through camera 202. Also, in some embodiments, the x-axis relationship between the pixel $p_s(x_s,y_s)$ 408 ($\Delta o_v c_v p_v$) and the pixel p(x,y) 406 ($\Delta o_s ca$) can be defined as follows.

$$\frac{x}{x_v} = \frac{d + d_{pc} + d_{ep}}{f_v} \tag{2}$$

Here, $x_v$ represents a distance along the x-axis of the pixel $p_v(x_v,y_v)$ 410 from the principal axis 404, $d_{pc}$ 412 represents a distance from the first see-through camera 202 to a first display panel 414, $d_{ep}$ 416 represents a distance from the first virtual camera 302 to the first display panel 414, and $f_v$ 320 represents a distance along the x-axis of the pixel $p_v(x_v,y_v)$ 408 from the first virtual camera 302. Equations (1) and (2) can be combined into the following equation, where $f_s$ is equal to $f_v$.

$$x_v = \frac{d}{d + d_{pc} + d_{ep}} x_s \tag{3}$$

Similarly, the y-axis relationship between the pixel $p_s(x_s, y_s)$ 408 ($\Delta o_s c_s a_s$) and the pixel p(x,y) 406 ($\Delta o_s ca$) can be defined as follows.

$$\frac{y}{y_s} = \frac{d}{f_s} \tag{4}$$

Here, y represents a distance along the y-axis of the pixel p(x,y) 406 from the first see-through camera 202, and $y_s$ represents a distance along the y-axis of the pixel $p_s(x_s,y_s)$ 408 from the first see-through camera 202. The y-axis relationship between the pixel $p_s(x_s,y_s)$ 408 ($\Delta o_v c_v p_v$) and the pixel p(x,y) 406 ($\Delta o_s ca$) can be defined as follows.

$$\frac{y}{y_v} = \frac{d + d_{pc} + d_{ep}}{f_v} \tag{5}$$

Here, $y_v$ represents a distance along the y-axis of the pixel $p_v(x_v,y_v)$ 410 from the first virtual camera 302, and $f_v$ represents a distance along the y-axis of the pixel $p_v(x_v,y_v)$ 408 from the first virtual camera 302. Equations (4) and (5) can be combined into the following equation.

$$y_v = \frac{d}{d + d_{pc} + d_{ep}} y_s \tag{6}$$

By combining Equations (3) and (6), the first mapping can be defined as follows.

$$\begin{cases} x_v = \dfrac{d}{d + d_{pc} + d_{ep}} x_s \\ y_v = \dfrac{d}{d + d_{pc} + d_{ep}} y_s \end{cases} \tag{7}$$

Here, $p_s(x_s,y_s)$ represents a pixel 408 in the first see-through frame 310, and $p_v(x_v,y_v)$ represents a pixel 410 in the first virtual frame 314.

Although FIGS. 4A and 4B illustrate one example of geometries 400 and 401 of direct passthrough with constant depth in VST AR, various changes may be made to FIGS. 4A and 4B. For example, the spacings of various components of the camera geometry 400 and the imaging geometry 401 can vary as needed or desired. Also, Equations (1)-(7) can be applied to other mappings for other camera viewpoints and matching virtual viewpoints. As a particular example, the same type of approach may be used to generate a second mapping associated with the second see-through camera 204 and the second virtual camera 304. In addition, the camera geometry 400 and the imaging geometry 401 may be used in any other suitable video transformation process and are not limited to the specific processes described above.

Figure 5:
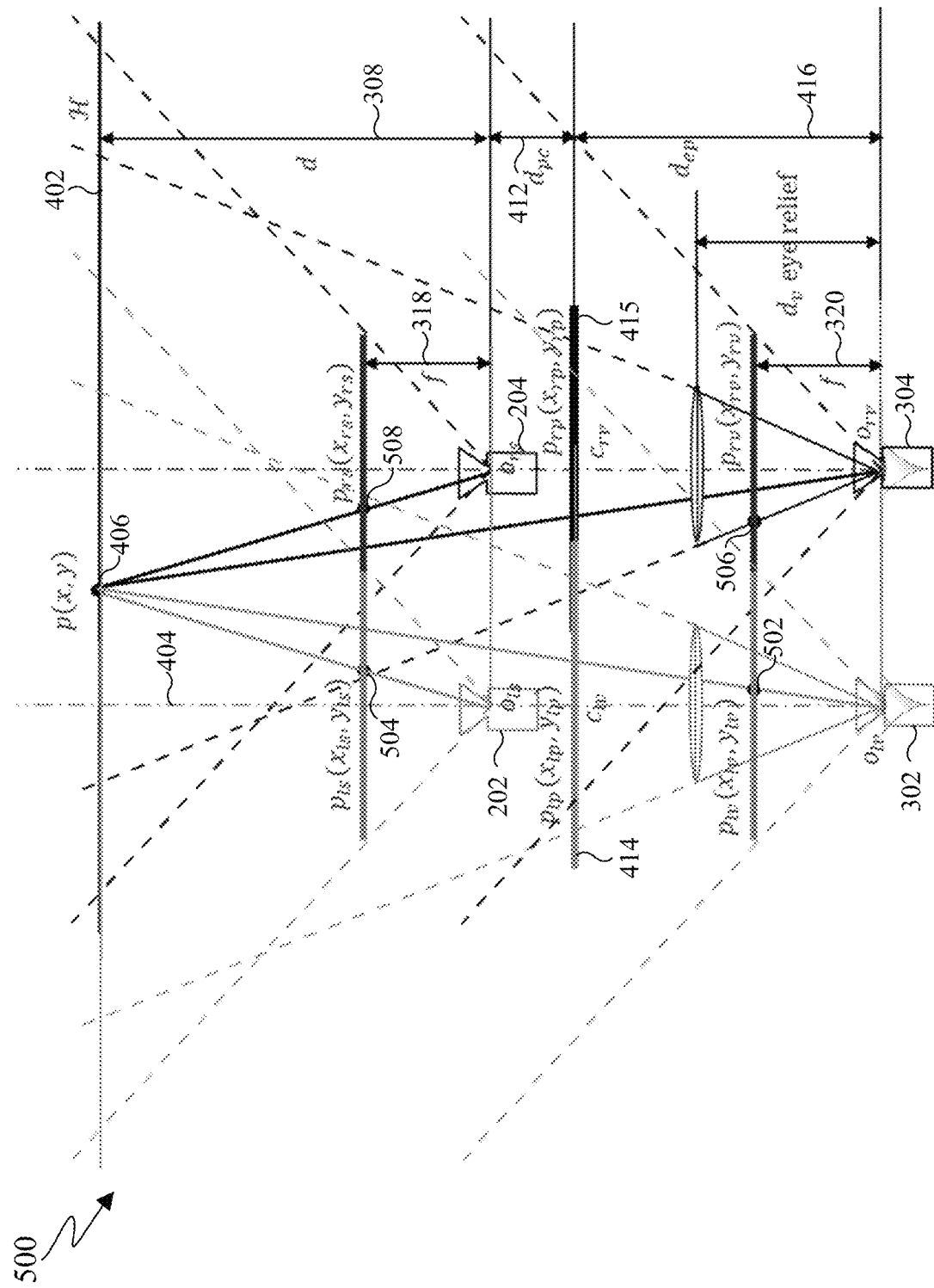
FIG. 5 illustrates an example stereo view geometry of a direct passthrough transformation in accordance with this disclosure.

FIG. 5 illustrates an example stereo view geometry 500 of a direct passthrough transformation in accordance with this disclosure. The stereo view geometry 500 here may represent an example of information from the obtain camera positions operation 208 used by the build camera mappings operation 210 shown in FIG. 2A. As shown in FIG. 5, the stereo view geometry 500 illustrates the geometry of direct passthrough transformations in stereo views. Here, the electronic device 101 can generate the first and second virtual frames 314 and 316 from the first and second see-through frames 310 and 312 according to the stereo view geometry 500 of the see-through camera arrangement 300.

Using Equation (7), the electronic device 101 can generate the first virtual frame 314 from the first see-through frame 310 and the second virtual frame 316 from the second see-through frame 312. For the first virtual frame 314, the electronic device 101 can generate the pixel $p_{lv}(x_{lv},y_{lv})$ 502 from the pixel $p_{ls}(x_{ls},y_{ls})$ 504, such as by using the following approach.

$$\begin{cases} x_{lv} = \dfrac{d}{d+d_{pc}+d_{ep}} x_{ls} \\ y_{lv} = \dfrac{d}{d+d_{pc}+d_{ep}} y_{ls} \end{cases} \quad (8)$$

Here, $(x_{ls},y_{ls})$ represents a coordinate in the first see-through frame 310, and $(x_{lv},y_{lv})$ represents a corresponding coordinate in the first virtual frame 314.

For the second virtual frame 316, the electronic device 101 can generate the pixel $p_{rv}(x_{rv},y_{rv})$ 506 from the pixel $p_{rs}(x_{rs},y_{rs})$ 508, such as by using the following approach.

$$\begin{cases} x_{rv} = \dfrac{d}{d+d_{pc}+d_{ep}} x_{rs} \\ y_{rv} = \dfrac{d}{d+d_{pc}+d_{ep}} y_{rs} \end{cases} \quad (9)$$

Here, $(x_{rs},y_{rs})$ represents a coordinate in the second see-through frame 312, and $(x_{rv},y_{rv})$ represents a corresponding coordinate in the second virtual frame 316.

In some embodiments, mappings can be created with lookup tables for the first and second see-through cameras 202 and 204 and the first and second virtual cameras 302 and 304 using Equations (8) and (9). The lookup tables may subsequently be accessed in order to enable rapid use of these mappings. Note, however, that the mappings may be used in any other suitable manner.

Although FIG. 5 illustrates one example of a stereo view geometry 500 of direct passthrough transformation, various changes may be made to FIG. 5. For example, the spacings of various components of the stereo view geometry 500 can vary as needed or desired. Also, the stereo view geometry 500 may be used in any other suitable video transformation process and is not limited to the specific processes described above.

Figure 6:
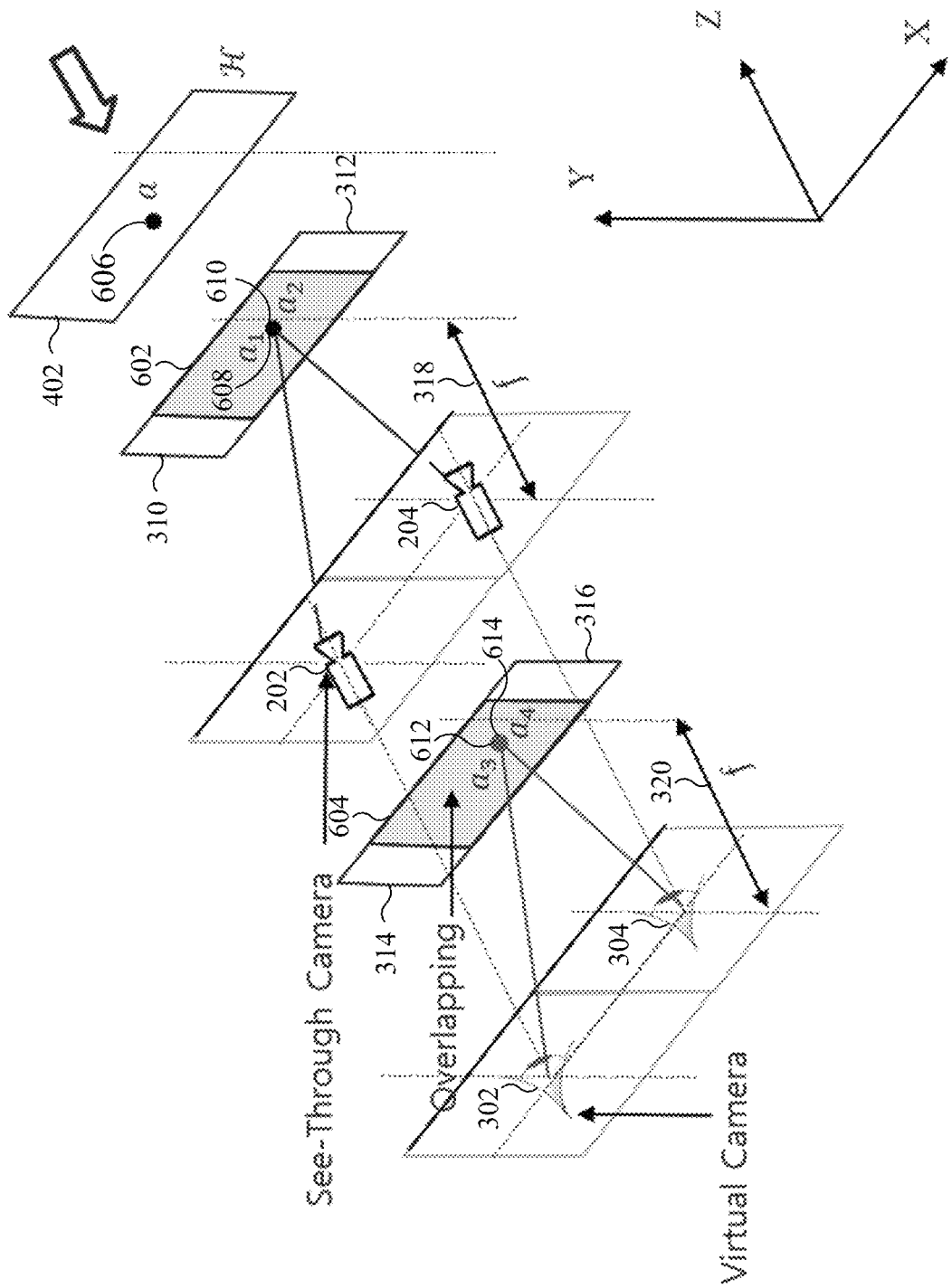
FIG. 6 illustrates example overlapping compensation between first and second virtual images in accordance with this disclosure.

FIG. 6 illustrates example overlapping compensation 600 between first and second virtual frames 314 and 316 in accordance with this disclosure. The overlapping compensation 600 here represents an example of how the build overlapping area mapping operation 212 shown in FIG. 2A may be performed.

As shown in FIG. 6, the overlapping compensation 600 shows a layout of the first and second see-through cameras 202 and 204 and the first and second virtual cameras 302 and 304 in 3D space. The first see-through camera 202 aligns with the first virtual camera 302, and the second see-through camera 204 aligns with the second virtual camera 304. A see-through overlapping area 602 exists between the first see-through frame 310 and the second see-through frame 312. Similarly, a virtual overlapping area 604 exists between the first virtual frame 314 and the second virtual frame 316.

In some embodiments, a third mapping can be generated between the virtual overlapping area 604 and the first virtual frame 314, a fourth mapping can be generated between the virtual overlapping area 604 and the second virtual frame 316, and a fifth mapping can be generated between these two overlapping areas 602 and 604. In particular embodiments, the third mapping can refer to a combination of the third and fifth mappings, and the fourth mapping can refer to a combination of the fourth and fifth mappings. The third mapping can be used to identify missing information in the first virtual frame 314 due to occlusions, and the fourth mapping can be used to identify missing information in the second virtual frame 316 due to occlusions.

As an example of this, for pixel a 606 in the projection plane 402, $a_1$ is a projected pixel 608 in the first see-through frame 310, and $a_2$ is a corresponding projected pixel 610 in the second see-through frame 312. Both of the projected pixels 608 and 610 are located in the see-through overlapping area 602. The pixel $a_1$ 608 and the pixel $a_2$ 610 are overlapped in the see-through overlapping area 602. Similarly, pixels $a_3$, $a_4$ 612 and 614 are the projections of the pixels $a_1$, $a_2$ 608 and 610, respectively, in the first and second virtual frames 314 and 316. Relationships can be determined between the pixels $a_3$, $a_4$ 612 and 614 and the pixels $a_1$, $a_2$ 608 and 610, between the pixel $a_4$ 614 and the first virtual frame 314, and between the pixel $a_3$ 612 and the second virtual frame 316. With these mappings, the electronic device 101 can utilize information in the viewpoint overlapping area 604 between the first and second virtual frames 314 and 316 to compensate for any holes that may be created due to operations such as viewpoint matching or parallax correction.

Although FIG. 6 illustrates one example of an overlapping compensation 600 between first and second virtual frames 314 and 316, various changes may be made to FIG. 6. For example, the spacings of various components of the overlapping compensation 600 can vary as needed or desired. Also, the overlapping compensation 600 may be used in any other suitable video transformation process and is not limited to the specific processes described above.

Figure 7:
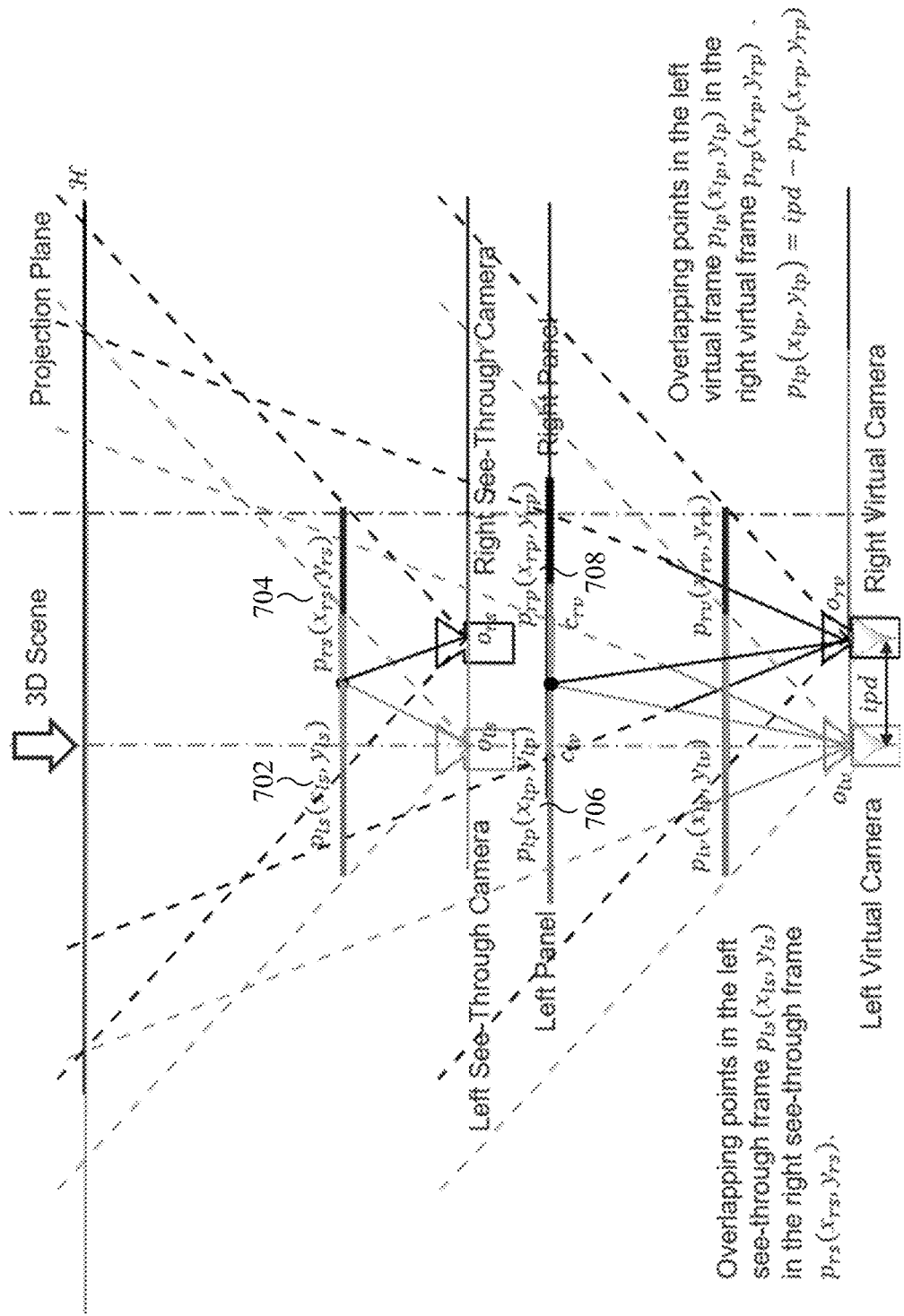
FIG. 7 illustrates an example coordinate relationship in an overlapping area between virtual camera frames in accordance with this disclosure.

FIG. 7 illustrates an example coordinate relationship 700 in an overlapping area between first and second virtual frames 314 and 316 in accordance with this disclosure. The coordinate relationship 700 here represents an example of how the build overlapping area mapping operation 212 shown in FIG. 2A may be determined.

As shown in FIG. 7, the coordinate relationship 700 shows a coordinate relationship in a virtual overlapping area 604 between the first and second virtual frames 314 and 316. The electronic device 101 can use a pixel 612 in the virtual overlapping area 604 of a first virtual frame 314 to replace a corresponding pixel 614 of the second virtual frame 316, which has a hole at the pixel 614. Also, the electronic device 101 can use a pixel 614 in the virtual overlapping area 604 of the second virtual frame 316 to replace a corresponding pixel 612 of the first virtual frame 314, which has a hole at the pixel 612.

As an example of this, assume that a pixel $p_{ls}(x_{ls},y_{ls})$ 702 is a pixel on the first see-through frame 310 and that a pixel $p_{rs}(x_{rs},y_{rs})$ 704 is a pixel on the second see-through frame 312. The pixels $p_{ls}(x_{ls},y_{ls})$ 702 and $p_{rs}(x_{rs},y_{rs})$ 704 can overlap each other in the see-through overlapping area 602. Two overlapping points $p_{lp}(x_{lp},y_{lp})$, $p_{rp}(x_{rp},y_{rp})$ 706 and 708 can be generated in the overlapping area of the first and second virtual frames 314 and 316, such as by using Equations (8) and (9) above. A third mapping between the overlapping area created by the pixels in the first virtual frame 314 and the second virtual frame 316 can be generated as follows.

$$p_{rp}(x_{rp},y_{rp}) \to \mathcal{M}(p_{lp}(x_{lp},y_{lp}),p_{rp}(x_{rp},y_{rp})), \quad (10)$$

Also, a fourth mapping between the overlapping area created by the pixels in the second virtual frame 316 and the first virtual frame 314 can be generated as follows.

$$p_{lp}(x_{lp},y_{lp}) \to \mathcal{M}(p_{lp}(x_{lp},y_{lp}),p_{rp}(x_{rp},y_{rp})), \quad (11)$$

With the mapping in Equation (10), hole pixels of the first virtual frame 314 in the overlapping area can be replaced with the pixels of the second virtual frame 316. Similarly, with the mapping in Equation (11), hole pixels of the second virtual frame 316 in the overlapping area can be replaced with the pixels of the first virtual frame 314. With this compensation, hole effects can be reduced or removed when at least one camera can capture information associated with the hole area.

In some embodiments, the distance between the first and second virtual cameras 302 and 304 can be based on an interpupillary distance ipd. In these embodiments, Equations (10) and (11) can be reduced, such as in the following manner.

$$p_{lp}(x_{lp},y_{lp}) = ipd - p_{rp}(x_{rp},y_{rp}) \quad (12)$$

$$p_{rp}(x_{rp},y_{rp}) = ipd - p_{lp}(x_{lp},y_{lp}) \quad (13)$$

Here, ipd represents a distance between the first and second virtual cameras 302 and 304 (which may also represent an interpupillary distance of the eyes of a user).

Although FIG. 7 illustrates one example of a coordinate relationship 700 in an overlapping area between virtual camera frames, various changes may be made to FIG. 7. For example, the spacings of various components of the coordinate relationship 700 can vary as needed or desired. Also, the coordinate relationship 700 may be used in any other suitable video transformation process and is not limited to the specific processes described above.

Figure 8A:
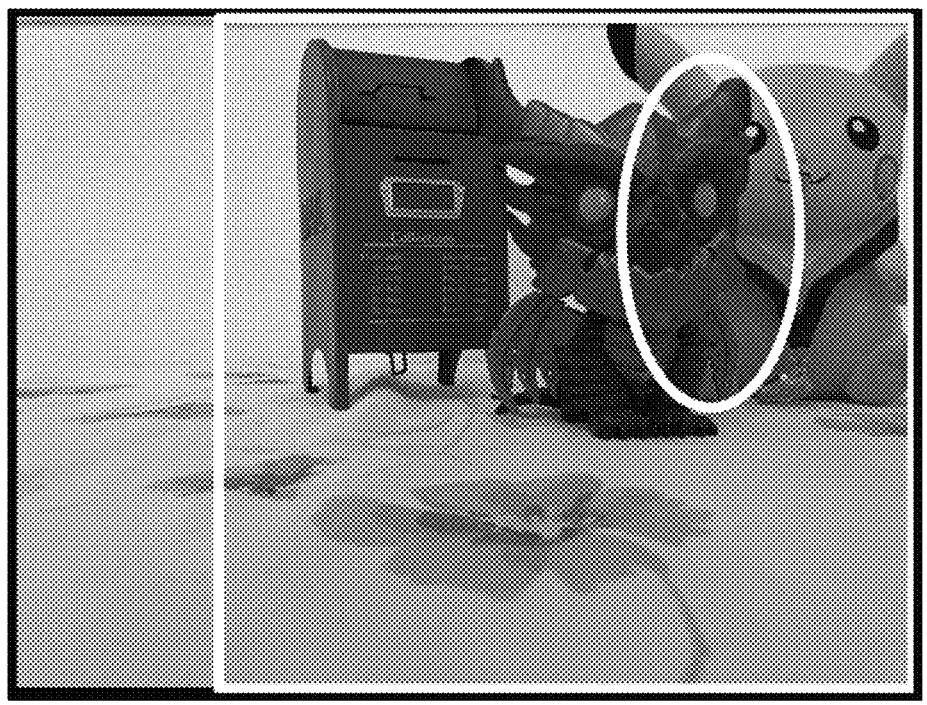
FIGS. 8A and 8B illustrate an example compensation of dis-occluded areas in a stereo image pair in accordance with this disclosure.
Figure 8B:
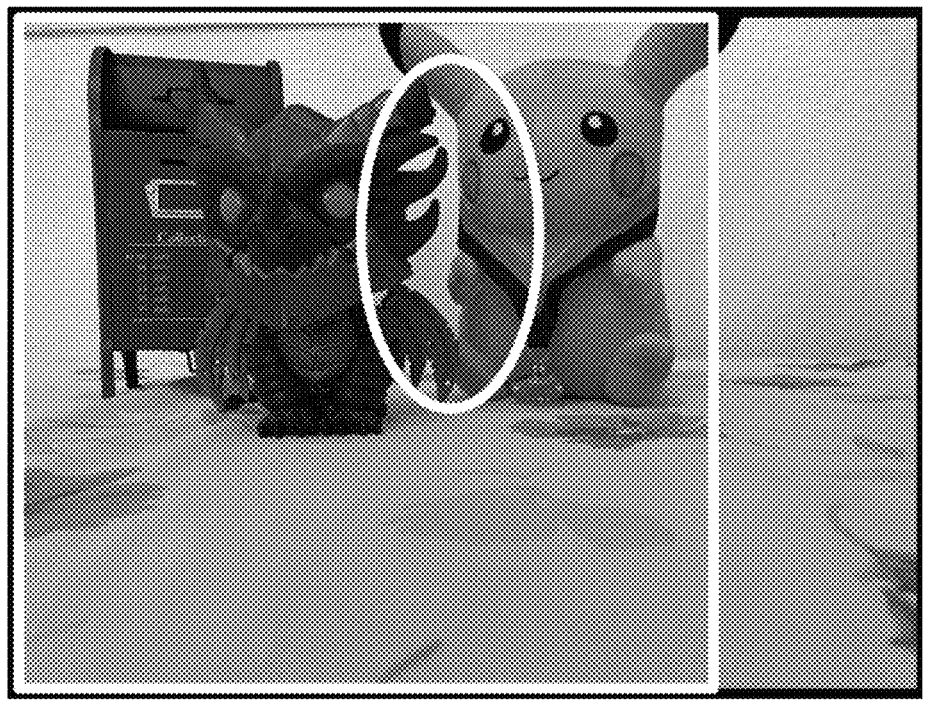

FIGS. 8A and 8B illustrate an example compensation of dis-occluded areas in a pair of stereo images 800 and 802 in accordance with this disclosure. As shown in FIGS. 8A and 8B, a scene includes three objects, namely a toy mailbox, a DEATHWING figure, and a PIKACHU figure. In the first stereo image 800, a portion of the PIKACHU figure inside the circled area is occluded by the DEATHWING figure. In the second image 802, the occluded portion of the PIKACHU figure in the first image 800 can be seen inside the circled area. In the viewpoint matching transformation of the first image 800, the occluded portion of the PIKACHU figure may be dis-occluded using the information from the second image 802. Similarly, missing information in the second image 802 in an overlapping area of the pair may be found in the first image 800. The boxes in FIGS. 8A and 8B indicate the overlapping areas of the first and second images 800 and 802.

Although FIGS. 8A and 8B illustrate one example of a compensation of dis-occluded areas in a pair of stereo images 800 and 802, various changes may be made to FIGS. 8A and 8B. For example, the number and arrangement of objects in a pair of stereo images 800 and 802 can vary as needed or desired. Also, the example compensation may be used in any other suitable video transformation process and is not limited to the specific processes described above.

Figure 9C:
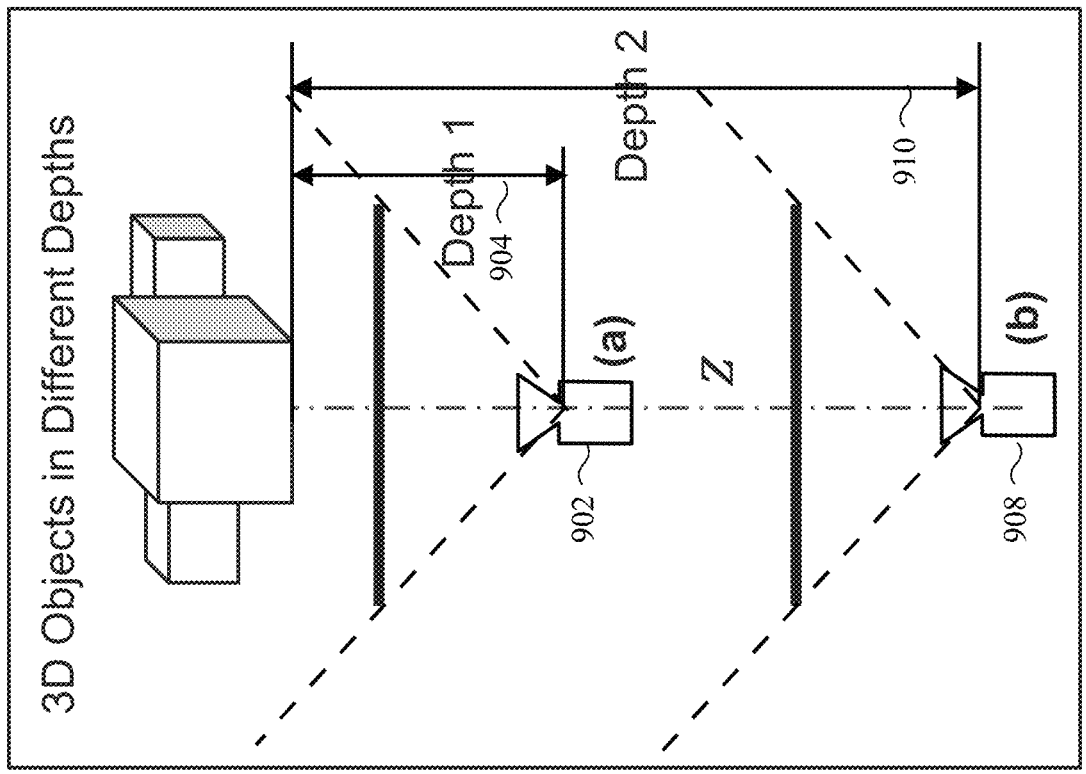
FIGS. 9A through 9C illustrate an example un-occlusion based on moving a camera away from objects in accordance with this disclosure.
Figure 9A:
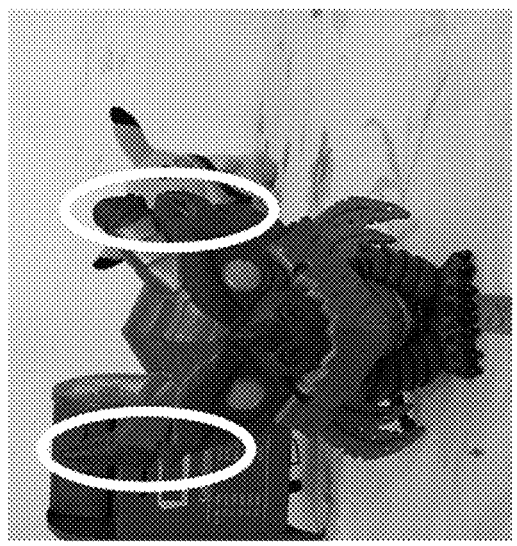
Figure 9B:

FIGS. 9A through 9C illustrate an example un-occlusion based on moving a camera away from objects in accordance with this disclosure. The un-occlusion here represents an example of how the first and second overlapping areas compensation operations 226 and 228 shown in FIG. 2B may be performed.

As shown in FIGS. 9A through 9C, occluded areas can become un-occluded while moving a camera away from objects in the depth direction. As can be seen here, a first image 900 can be captured at a first viewpoint 902 with a first depth 904, and a second image 906 can be captured at a second viewpoint 908 with a second depth 910. The second depth 910 can be greater than the first depth 904. From the first image 900, some areas of the mailbox and the PIKACHU figure are occluded by the DEATHWING figure. From the second image 906, occluded areas of mailbox in the first image 900 (such as the handle area) and occluded areas of the PIKACHU figure in the first image 900 (such as an eye area) become un-occluded, which means that one or more occluded areas in the first image 900 become visible in the second image 906. If the second image 906 is created by transforming the first image 900 from the first viewpoint 902 to the second viewpoint 908, the occluded areas become holes after the transformation since the first image 900 does not have any information in the occluded areas of the occluded objects. The missing information can be estimated by taking the information from surrounding pixels, such as by using information in previous image captures, or generated in any other suitable manner for recovering or filling in missing information.

Although FIGS. 9A through 9C illustrate an example un-occlusion based on moving a camera away from objects, various changes may be made to FIGS. 9A through 9C. For example, the number and arrangement of objects in the un-occlusion may be vary as need or desired. Also, the un-occlusion may be used in any other suitable video transformation process and is not limited to the specific processes described above.

FIG. 10 illustrates an example method 1000 for direct passthrough in VST AR in accordance with this disclosure. For ease of explanation, the method 1000 of FIG. 10 is described as being performed using the electronic device 101 in the network configuration 100 of FIG. 1. However, the method 1000 may be performed with any other suitable device(s) and in any other suitable system(s).

As shown in FIG. 10, the electronic device 101 receives a first image from a first camera viewpoint and a second image from a second camera viewpoint at step 1002. For example, a first image can be received from the first see-through camera 202 with a first camera viewpoint, and a second image can be received from the second see-through camera 204 with a second camera viewpoint. The first and second viewpoints can correspond to left and right viewpoints, and the first and second see-through cameras 202 and 204 can correspond to left and right see-through cameras. The first and second images can capture a scene from different viewpoints that are separated by a distance between the first and second cameras. The arrangement of the first and second see-through cameras 202 and 204 and the first and second camera viewpoints can be fixed on and known by the electronic device 101.

The electronic device 101 generates a first virtual image by applying a first mapping between the first virtual camera viewpoint and a first virtual viewpoint at step 1004. The first virtual image corresponding to the first virtual viewpoint can be generated by applying a first mapping to the first image. The first mapping can be based on relative positions of the first camera viewpoint and the first virtual viewpoint corresponding to a first eye of a user. In some cases, the first mapping can be defined by Equation (8). The electronic device 101 generates a second virtual image by applying a second mapping between the second virtual camera viewpoint a second virtual viewpoint at step 1006. The second virtual image corresponding to the second virtual viewpoint can be generated by applying a second mapping to the second image. The second mapping can be based on relative positions of the second camera viewpoint and the second virtual viewpoint corresponding to a second eye of the user. In some cases, the second mapping can be defined by Equation (9).

The electronic device 101 determines that the virtual images have missing information for at least one pixel within the first camera viewpoint and the second camera viewpoint at step 1008. In some cases, the missing information for a pixel can be caused by the transformation from a see-through frame to a virtual frame. In some embodiments, the electronic device 101 can locate pixels in a virtual frame that do not have information provided from a corresponding see-through frame. The electronic device 101 applies an overlapping area mapping to retrieve the missing image information from a corresponding pixel in the opposite virtual image at step 1010. For example, a third mapping can be applied between the first virtual image and the second virtual image to retrieve the missing image information from a corresponding pixel in the second virtual image. The third mapping can be based on an interpupillary distance between the first virtual viewpoint and the second virtual viewpoint. Also or alternatively, a fourth mapping can be applied between the first virtual image and the second virtual image to retrieve the missing image information from a corresponding pixel in the first virtual image. The fourth mapping can be based on an interpupillary distance between the first virtual viewpoint and the second virtual viewpoint. In some cases, the third and fourth mappings can be respectively defined in Equations (12) and (13).

The electronic device 101 presents the first and second virtual images at step 1012. For example, the first virtual image can be presented to the first virtual viewpoint, and the second virtual image can be presented to the second virtual viewpoint. The first and second virtual viewpoint can be associated with at least one display panel of an AR device. For example, the first virtual image can be presented on a first display panel or a first portion of a common display panel, and the second virtual image can be presented on a second display panel or a second portion of the common display panel.

Although FIG. 10 illustrates one example of a method 1000 for direct passthrough in VST AR, various changes may be made to FIG. 10. For example, while shown as a series of steps, various steps in FIG. 10 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining a first image from a first see-through camera with a first camera viewpoint and a second image from a second see-through camera with a second camera viewpoint;
generating a first virtual image corresponding to a first virtual viewpoint by applying a first mapping to the first image, the first mapping based on relative positions of the first camera viewpoint and the first virtual viewpoint corresponding to a first eye of a user;
generating a second virtual image corresponding to a second virtual viewpoint by applying a second mapping to the second image, the second mapping based on relative positions of the second camera viewpoint and the second virtual viewpoint corresponding to a second eye of the user; and
presenting the first virtual image to the first virtual viewpoint and the second virtual image to the second virtual viewpoint on at least one display panel of an augmented reality (AR) device.

2. The method of claim 1, wherein the first mapping is defined as:

$$\begin{cases} x_{lv} = \dfrac{d}{d + d_{pc} + d_{ep}} x_{ls} \\ y_{lv} = \dfrac{d}{d + d_{pc} + d_{ep}} y_{ls} \end{cases}$$

where $(x_{ls}, y_{ls})$ is a pixel position in the first image, $(x_{lv}, y_{lv})$ is a corresponding pixel position in the first virtual image, $d_{ep}$ is a distance between the first virtual viewpoint and the at least one display panel, $d_{pc}$ is a distance between the first camera viewpoint and the at least one display panel, and d is a constant depth of a projection plane to the first see-through camera.

3. The method of claim 1, wherein the second mapping is defined as:

$$\begin{cases} x_{rv} = \dfrac{d}{d + d_{pc} + d_{ep}} x_{rs} \\ y_{rv} = \dfrac{d}{d + d_{pc} + d_{ep}} y_{rs} \end{cases}$$

where $(x_{rs}, y_{rs})$ is a pixel position in the second image, $(x_{rv}, y_{rv})$ is a corresponding pixel position in the second virtual image, $d_{ep}$ is a distance between the second virtual viewpoint and the at least one display panel, $d_{pc}$ is a distance between the second camera viewpoint and the at least one display panel, and d is a constant depth of a projection plane to the second see-through camera.

4. The method of claim 1, further comprising:
    determining that the first virtual image has missing image information for a pixel within the first camera viewpoint and the second camera viewpoint; and
    applying a third mapping between the first virtual image and the second virtual image to retrieve the missing image information from a corresponding pixel in the second virtual image, the third mapping based on an interpupillary distance between the first virtual viewpoint and the second virtual viewpoint.

5. The method of claim 4, wherein the third mapping is defined as:

$$p_{lp}(x_{lp},y_{lp})=ipd-p_{rp}(x_{rp},y_{rp})$$

where $p_{lp}(x_{lp},y_{lp})$ is a pixel of the first virtual image, $p_{rp}(x_{rp},y_{rp})$ is a pixel of the second virtual image, and ipd is the interpupillary distance.

6. The method of claim 1, further comprising:
    determining that the second virtual image has missing image information for a pixel within the first camera viewpoint and the second camera viewpoint; and
    applying an additional mapping between the first virtual image and the second virtual image to retrieve the missing image information from a corresponding pixel in the first virtual image, the additional mapping based on an interpupillary distance between the first virtual viewpoint and the second virtual viewpoint.

7. The method of claim 6, wherein the additional mapping is defined as:

$$p_{rp}(x_{rp},y_{rp})=ipd-p_{lp}(x_{lp},y_{lp}))$$

where $p_{lp}(x_{lp},y_{lp})$ is a pixel of the first virtual image, $p_{rp}(x_{rp},y_{rp})$ is a pixel of the second virtual image, and ipd is the interpupillary distance.

8. A video see-through (VST) augmented reality (AR) device comprising:
    at least one display panel;
    a first see-through camera and a second see-through camera; and
    at least one processing device configured to:
        obtain a first image from the first see-through camera with a first camera viewpoint and a second image from the second see-through camera with a second camera viewpoint;
        apply a first mapping to the first image in order to generate a first virtual image corresponding to a first virtual viewpoint, the first mapping based on relative positions of the first camera viewpoint and the first virtual viewpoint corresponding to a first eye of a user;
        apply a second mapping to the second image in order to generate a second virtual image corresponding to a second virtual viewpoint, the second mapping based on relative positions of the second camera viewpoint and the second virtual viewpoint corresponding to a second eye of the user; and
        initiate presentation of the first virtual image to the first virtual viewpoint and the second virtual image to the second virtual viewpoint on the at least one display panel.

9. The VST AR device of claim 8, wherein the first mapping is defined as:

$$\begin{cases} x_{lv} = \dfrac{d}{d+d_{pc}+d_{ep}}x_{ls} \\ y_{lv} = \dfrac{d}{d+d_{pc}+d_{ep}}y_{ls} \end{cases}$$

where $(x_{ls},y_{ls})$ is a pixel position in the first image, $(x_{lv}, y_{lv})$ is a corresponding pixel position in the first virtual image, $d_{ep}$ is a distance between the first virtual viewpoint and the at least one display panel, $d_{pc}$ is a distance between the first camera viewpoint and the at least one display panel, and d is a constant depth of a projection plane to the first see-through camera.

10. The VST AR device of claim 8, wherein the second mapping is defined as:

$$\begin{cases} x_{rv} = \dfrac{d}{d+d_{pc}+d_{ep}}x_{rs} \\ y_{rv} = \dfrac{d}{d+d_{pc}+d_{ep}}y_{rs} \end{cases}$$

where $(x_{rs},y_{rs})$ is a pixel position in the second image, $(x_{rv},y_{rv})$ is a corresponding pixel position in the second virtual image, $d_{ep}$ is a distance between the second virtual viewpoint and the at least one display panel, $d_{pc}$ is a distance between the second camera viewpoint and the at least one display panel, and d is a constant depth of a projection plane to the second see-through camera.

11. The VST AR device of claim 8, wherein the at least one processing device is further configured to:
    determine that the first virtual image has missing image information for a pixel within the first camera viewpoint and the second camera viewpoint; and
    apply a third mapping between the first virtual image and the second virtual image to retrieve the missing image information from a corresponding pixel in the second virtual image, the third mapping based on an interpupillary distance between the first virtual viewpoint and the second virtual viewpoint.

12. The VST AR device of claim 11, wherein the third mapping is defined as:

$$p_{lp}(x_{lp},y_{lp})=ipd-p_{rp}(x_{rp},y_{rp})$$

where $p_{lp}(x_{lp},y_{lp})$ is a pixel of the first virtual image, $p_{rp}(x_{rp},y_{rp})$ is a pixel of the second virtual image, and ipd is the interpupillary distance.

13. The VST AR device of claim 8, wherein the at least one processing device is further configured to:
    determine that the second virtual image has missing image information for a pixel within the first camera viewpoint and the second camera viewpoint; and
    apply an additional mapping between the first virtual image and the second virtual image to retrieve the missing image information from a corresponding pixel in the first virtual image, the additional mapping based on an interpupillary distance between the first virtual viewpoint and the second virtual viewpoint.

14. The VST AR device of claim 13, wherein the additional mapping is defined as:

$$p_{rp}(x_{rp},y_{rp})=ipd-p_{lp}(x_{lp},y_{lp}))$$

where $p_{lp}(x_{lp},y_{lp})$ is a pixel of the first virtual image, $p_{rp}(x_{rp},y_{rp})$ is a pixel of the second virtual image, and ipd is the interpupillary distance.

15. A non-transitory machine readable medium containing instructions that when executed cause at least one processor to:
- obtain a first image from a first see-through camera with a first camera viewpoint and a second image from a second see-through camera with a second camera viewpoint;
- apply a first mapping to the first image in order to generate a first virtual image corresponding to a first virtual viewpoint, the first mapping based on relative positions of the first camera viewpoint and the first virtual viewpoint corresponding to a first eye of a user;
- apply a second mapping to the second image in order to generate a second virtual image corresponding to a second virtual viewpoint, the second mapping based on relative positions of the second camera viewpoint and the second virtual viewpoint corresponding to a second eye of the user; and
- initiate presentation of the first virtual image to the first virtual viewpoint and the second virtual image to the second virtual viewpoint on at least one display panel of an AR device.

16. The non-transitory machine readable medium of claim 15, wherein the first mapping is defined as:

$$\begin{cases} x_{lv} = \dfrac{d}{d + d_{pc} + d_{ep}} x_{ls} \\ y_{lv} = \dfrac{d}{d + d_{pc} + d_{ep}} y_{ls} \end{cases}$$

where $(x_{ls}, y_{ls})$ is a pixel position in the first image, $(x_{lv}, y_{lv})$ is a corresponding pixel position in the first virtual image, $d_{ep}$ is a distance between the first virtual viewpoint and the at least one display panel, $d_{pc}$ is a distance between the first camera viewpoint and the at least one display panel, and d is a constant depth of a projection plane to the first see-through camera.

17. The non-transitory machine readable medium of claim 15, wherein the second mapping is defined as:

$$\begin{cases} x_{rv} = \dfrac{d}{d + d_{pc} + d_{ep}} x_{rs} \\ y_{rv} = \dfrac{d}{d + d_{pc} + d_{ep}} y_{rs} \end{cases}$$

where $(x_{rs}, y_{rs})$ is a pixel position in the second image, $(x_{rv}, y_{rv})$ is a corresponding pixel position in the second virtual image, $d_{ep}$ is a distance between the second virtual viewpoint and the at least one display panel, $d_{pc}$ is a distance between the second camera viewpoint and the at least one display panel, and d is a constant depth of a projection plane to the second see-through camera.

18. The non-transitory machine readable medium of claim 15, further containing instructions that when executed cause the at least one processor to:
- determine that the first virtual image has missing image information for a pixel within the first camera viewpoint and the second camera viewpoint; and
- apply a third mapping between the first virtual image and the second virtual image to retrieve the missing image information from a corresponding pixel in the second virtual image, the third mapping based on an interpupillary distance between the first virtual viewpoint and the second virtual viewpoint.

19. The non-transitory machine readable medium of claim 18, wherein the third mapping is defined as:

$$p_{lp}(x_{lp}, y_{lp}) = ipd - p_{rp}(x_{rp}, y_{rp})$$

where $p_{lp}(x_{lp}, y_{lp})$ is a pixel of the first virtual image, $p_{rp}(x_{rp}, y_{rp})$ is a pixel of the second virtual image, and ipd is the interpupillary distance.

20. The non-transitory machine readable medium of claim 15, further containing instructions that when executed cause the at least one processor to:
- determine that the second virtual image has missing image information for a pixel within the first camera viewpoint and the second camera viewpoint; and
- apply an additional mapping between the first virtual image and the second virtual image to retrieve the missing image information from a corresponding pixel in the first virtual image, the additional mapping based on an interpupillary distance between the first virtual viewpoint and the second virtual viewpoint;
- wherein the additional mapping is defined as:

$$p_{rp}(x_{rp}, y_{rp}) = ipd - p_{lp}(x_{lp}, y_{lp}))$$

where $p_{lp}(x_{lp}, y_{lp})$ is a pixel of the first virtual image, $p_{rp}(x_{rp}, y_{rp})$ is a pixel of the second virtual image, and ipd is the interpupillary distance.

* * * * *